(12) United States Patent
Brühn

(10) Patent No.: US 7,999,414 B2
(45) Date of Patent: Aug. 16, 2011

(54) APPARATUS AND METHOD FOR WIRELESS ENERGY AND/OR DATA TRANSMISSION BETWEEN A SOURCE DEVICE AND AT LEAST ONE TARGET DEVICE

(75) Inventor: Alfred Brühn, Karlsruhe (DE)

(73) Assignee: Maquet GmbH & Co. KG, Rastatt (DE)

( * ) Notice: Subject to any disclaimer, the term of this patent is extended or adjusted under 35 U.S.C. 154(b) by 165 days.

(21) Appl. No.: 12/200,949

(22) Filed: Aug. 29, 2008

(65) Prior Publication Data
US 2009/0085408 A1    Apr. 2, 2009

(30) Foreign Application Priority Data

Sep. 1, 2007 (DE) .......... 10 2007 041 686
Dec. 18, 2007 (DE) .......... 10 2007 060 811

(51) Int. Cl.
*H01F 27/42* (2006.01)
(52) U.S. Cl. ............ 307/104
(58) Field of Classification Search ........ 307/104; 320/108
See application file for complete search history.

(56) References Cited

U.S. PATENT DOCUMENTS

| | | | |
|---|---|---|---|
| 4,035,745 A | 7/1977 | Doetsch et al. | |
| 4,656,412 A * | 4/1987 | McLyman | 320/139 |
| 4,800,328 A | 1/1989 | Bolger et al. | |
| 4,928,087 A | 5/1990 | Kreft et al. | |
| 5,536,979 A * | 7/1996 | McEachern et al. | 307/104 |
| 6,118,249 A | 9/2000 | Brockmann et al. | |
| 6,278,266 B1 * | 8/2001 | Glasband | 323/355 |
| 6,498,456 B2 * | 12/2002 | Ettes et al. | 320/108 |
| 6,960,985 B2 | 11/2005 | Wuidart | |
| 2003/0094855 A1 | 5/2003 | Lohr et al. | |
| 2008/0252254 A1 * | 10/2008 | Osada | 320/108 |

FOREIGN PATENT DOCUMENTS

| | | |
|---|---|---|
| DE | 38 10 702 A1 | 10/1989 |
| DE | 196 45 891 A1 | 5/1998 |
| DE | 198 37 675 A1 | 2/2000 |
| DE | 601 02 613 T2 | 3/2005 |
| WO | WO 99/26329 A1 | 5/1999 |

OTHER PUBLICATIONS

German Search Report for European Patent Application No. EP 08 16 3302 dated Jan. 20, 2009.

* cited by examiner

*Primary Examiner* — Michael Rutland Wallis
(74) *Attorney, Agent, or Firm* — McCormick, Paulding & Huber LLP

(57) ABSTRACT

The invention relates to an apparatus and a method for wireless energy and/or data transmission between a source device and at least one target device, in which apparatus and method a voltage is induced by at least one primary coil (18), on the source-device side, of at least one primary circuit in at least one secondary coil (20), on the target-device side, of at least one secondary circuit and in at least one coil of at least one resonant circuit, the resonant circuit being arranged so as to be electrically isolated from the primary circuit and from the secondary circuit.

7 Claims, 11 Drawing Sheets

APPARATUS AND METHOD FOR WIRELESS ENERGY AND/OR DATA TRANSMISSION BETWEEN A SOURCE DEVICE AND AT LEAST ONE TARGET DEVICE

CROSS REFERENCE TO RELATED APPLICATION

Applicant hereby claims foreign priority benefits under U.S.C. §119 from German Patent Application No. 10 2007 041 686.7 filed on Sep. 1, 2007 and German Patent Application No. 10 2007 060 811.1 filed Dec. 18, 2007, the contents of which are incorporated by reference herein.

TECHNICAL FIELD

The invention relates to an apparatus and a method for wireless energy and/or data transmission between a source device and at least one target device, in which apparatus and method at least one primary circuit with at least one primary coil, on the source-device side, and at least one secondary circuit with at least one secondary coil, on the target-device side, are provided. In particular, the invention relates to inductive energy transmission between devices or device components for the purpose of charging at least one rechargeable battery arranged in a device or in a device component, such as for the purpose of charging a rechargeable battery in a remote control, for example.

BACKGROUND ART

For medical devices, in particular for operating tables, remote controls are available as wireless operating devices, with the aid of which the respective device can be operated from various positions and at a certain distance from a receiver unit of the device for receiving the signals from the remote control. Such remote controls make convenient use of at least some of the operating functions of the medical device or of the operating table possible. Such operating devices are operated by batteries or rechargeable batteries in the prior art. In order to ensure ease of use of such a remote control, it is recommended to use rechargeable batteries, as a result of which the remote control can be used as the operating unit throughout subsequent treatment once the rechargeable batteries have been charged or recharged.

In addition, the use of special rechargeable batteries makes it possible to provide a large quantity of energy for operation of the remote control in the case of a relatively small physical size which is matched to the design-related conditions of the remote control. In order to charge the rechargeable batteries, a connection to a further energy source, in particular to a suitable switched-mode power supply or to a charger, needs to be produced. For this purpose, both arrangements with a DC connection between the charger and the rechargeable battery and without a DC connection between the charger and the rechargeable battery are known in the prior art. In the case of the known arrangements in which there is no DC connection between the remote control and the energy source (i.e. in the case of DC isolation), the energy transmission generally takes place inductively between a charging station or base station and the remote control. The charging station or the base station is in this case the source device and the remote control is the target device.

FIG. 1 illustrates a known arrangement 10 for the inductive transmission of energy. The arrangement 10 in this case comprises a source device 12 and a target device 14. The source device 12 comprises an energy source 16, which is in the form of an AC source and generates an AC voltage. In addition, the source device 12 comprises a coil 18 on the source-device side which acts as a primary coil 18 for energy or data transmission to the target device 14. The target device 14 comprises a coil 20 on the target-device side which acts as a secondary coil 20 and is electrically connected to a charging circuit 22, which is illustrated as a load resistor. The energy source 16 of the source device 12 is electrically connected to the primary coil 18 on the source-device side, with the result that the energy source 16 brings about an alternating current flow through the coil 18, as a result of which the coil 18 generates a magnetic field which changes over time (alternating magnetic field). The secondary coil 20 on the target-device side is located in the magnetic field induced by the primary coil 18 if the target device 14 is located in a charging and/or data transmission position. A voltage is induced in the secondary coil 20 by means of the alternating magnetic field, and, as a result of this voltage, a current flow through the charging circuit 22, which is illustrated as a load resistor, is possible, with the result that the energy transmitted from the energy source 16 via the coils 18, 20 is supplied to this charging circuit 22. As an alternative or in addition to the charging circuit 22, an evaluation circuit for determining data transmitted via the arrangement shown in FIG. 1 can be provided.

FIG. 2 illustrates an arrangement 24 for transmitting energy between a source device 26 and a target device 28 similar to the arrangement 10 shown in FIG. 1. Identical elements have the same reference symbols. In contrast to the arrangement 10 shown in FIG. 1, the circuit of the source device 26 and the circuit of the target device 28 each contain a capacitor 30, 32. A series resonant circuit is formed by the arrangement of the capacitor 30 in the circuit of the source device 26 and a parallel resonant circuit is formed by the capacitor 32 in the secondary circuit. Resonant coupling takes place between the source device 26 and the target device 28 by means of these resonant circuits, and this results in a relatively high efficiency in the transmission of energy from the primary circuit to the secondary circuit or from the source device 26 to the target device 28. In the arrangement 24 shown in FIG. 2, a magnetic field is induced by the primary coil 18. The primary coil 18 and the capacitor 30 form a primary circuit which is tuned to resonance. The magnetic field induced by the primary coil 18 passes through the secondary coil 20, which is part of the secondary resonant circuit. However, in practice it is difficult to match the resonant frequencies of the primary-side resonant circuit and of the secondary-side resonant circuit to one another since the resonance conditions change depending on the state of charge of the rechargeable batteries or depending on the resistance value of the load resistor 22, which changes over the charging cycle.

In order to match the resonant frequency, various measures are conceivable both on the primary side and on the secondary side. For example, a suitable frequency of the energy source 16 can be selected, with it being possible for the frequency to be preset, set in a predetermined frequency range, regulated or corrected. Furthermore, suitable design measures, in particular mechanical and electronic measures, can be provided in order to maintain the resonance conditions over a relatively long charging cycle. In particular, maintenance of the resonance condition can be achieved or at least assisted by a suitable selection of components. In addition, resonance adjustment can be achieved by changing the capacitance of at least one of the capacitors 30, 32 or the inductance of at least one of the coils 18, 20. However, this is associated with a relatively high level complexity. Overall, maintenance of the resonance conditions in the primary and/or secondary circuit is relatively complex.

FIG. 3 illustrates an arrangement 34 for transmitting energy between a source device 36 and a target device 38 similar to the arrangement 10 shown in FIG. 1. In contrast to the arrangement 10 shown in FIG. 1, the primary coil 18 is arranged around a first iron core segment 40 and the secondary coil 20 is arranged around a second iron core segment 42. The iron core segments 40, 42 have a gap 44 on their mutually facing end sides in a charging and/or data transmission position. The gap 44 is in particular formed by the respectively closed housings of the source device 36 and of the target device 38 and/or by an additional air gap. The lines of force emerging from one of the end sides, which are remote from one another, of the magnet core segments 40, 42 enter the opposite remote end side and close the magnetic circuit with the magnet core segments 40, 42 and with the gap 44.

FIG. 4 shows an arrangement 46 similar to the arrangement 34 shown in FIG. 3, with, both in the case of the source device 48 and in the case of the target device 50, magnet core segments 52, 54 being inserted which are u-shaped and are arranged in a data and/or energy transmission position in such a way that in each case both end faces of the magnet core segments 52, 54 are opposite one another and are arranged at a distance from one another in such a way that in each case a gap 56, 58 similar to the gap 44 in the arrangement 34 is provided between these end sides.

FIG. 5 illustrates an arrangement 60 similar to the arrangement 46 shown in FIG. 4, with in each case one capacitor 30, 32 being provided in the circuit of the source device 62 and in the circuit of the target device 64 so as to form resonant circuits in the same way as already described in connection with FIG. 2.

In general, the housings of the source devices and of the target devices are made from electrically insulating material which does not weaken electromagnetic fields or weakens them only to a small extent. As a result of the minimum thicknesses required for the housing walls, in particular for the electrical insulation and mechanical strength of the housing of the source device and of the target device, the gap or gaps has or have a minimum gap width in the known embodiments shown which substantially influences the properties of the magnetic circuit. The gap width is critical for the magnetic field strength in the magnetic circuit, formed by the magnet core segments, of the arrangement shown in FIGS. 1 to 5.

The document DE 38 10 702 C2 has disclosed an arrangement in which a frequency correction of an energy source is carried out. For this purpose, in this arrangement the phase relationship between the current and the voltage in the primary circuit is determined and regulated to a preset value.

The document DE 198 37 675 A1 has disclosed a charging apparatus in which a power oscillator is provided in a primary part of an inductive coupler for the inductive transmission of charging energy. A switching apparatus for alternately drawing power for charging the rechargeable battery is provided in the secondary part.

The document DE 601 02 613 T2 has disclosed an arrangement in which the transmission power of the energy output by a transponder read apparatus is set. In this case, a series resonant circuit is provided in the primary-side or transmitter-side circuit for providing the transmission power. Up-to-date information on the magnetic coupling between a transponder and the read apparatus is detected. The resonant circuit has a variable capacitance, by means of which the resonant circuit can be tuned.

BRIEF SUMMARY OF THE INVENTION

Against the background of the arrangements known in the prior art, the invention is based on the object of specifying an apparatus and a method for wireless energy and/or data transmission between a source device and at least one target device, in which apparatus and method effective energy and data transmission is possible alongside a simple design.

This object is achieved by an apparatus having the features of Patent Claim 1 and by a method having the features of the independent method claim. Advantageous developments of the invention are specified in the dependent patent claims.

As a result of an apparatus according to the invention and a method according to the invention for wireless energy and/or data transmission between a source device and at least one target device, the resonant frequency of the resonator and the fulfillment of the resonance condition do not need to be dependent on the varying conditions of the primary circuit and of the secondary circuit. In particular, the resonator is independent of the variable load in the secondary circuit. As a result of the resonator, which is electrically isolated from the primary circuit and from the secondary circuit, in addition targeted efficient energy transmission between the primary circuit and the secondary circuit can take place. In the case of the arrangement of a plurality of resonators, which are each electrically isolated from the primary circuit and from the secondary circuit, with different resonant frequencies, virtually any desired signal forms can be transmitted, such as, for example, square-wave signals which comprise, for example, a plurality of harmonic oscillations. Each resonator is in this case preferably formed by a resonant circuit, which comprises in particular at least one inductance and a capacitance.

Energy is then transmitted from the primary side to the secondary side by each of the resonant circuits, as a result of which the total quantity of energy transmitted is the sum of the energy component transmitted directly from the primary circuit to the secondary circuit and the energy component transmitted from the primary circuit to the resonant circuits and from the resonant circuits to the secondary circuit. For example, the total quantity of energy transmitted can be increased by approximately 15% if two resonators are provided instead of one. The second resonator preferably has twice the resonant frequency of the first resonator. For the invention, however, instead of an electromagnetic resonator, other resonators, such as acoustic, mechanical or hydromechanical resonators, can also be used. A resonator within the meaning of the invention is in this case any oscillatory system whose components are tuned to an input frequency in such a way that the resonator decays on excitation at this frequency.

In a development of the invention, the resonator is in the form of a resonant circuit or the resonators are in the form of resonant circuits. The primary coil, the secondary coil and the inductance of the isolated resonant circuit/the isolated resonant circuits are in this case preferably arranged in the same magnetic circuit. It is advantageous here if the primary coil, the secondary coil and a coil forming the inductance of the isolated resonant circuit are arranged around a magnet core surrounded by the magnetic circuit, the magnetic circuit preferably having a magnet core without a gap.

In addition, it is advantageous to provide at least two resonant circuits which are each electrically isolated from the secondary circuit and from the respective other circuit. The inductances of the at least two resonant circuits are preferably each in the form of a coil, whose windings are formed as bifilar windings or, in the case of more than two resonant circuits, as n-filar windings. As a result of the bifilar windings or, in the case of n resonant circuits, as a result of the n-filar windings, the coils formed by these windings preferably have the same inductance, with the result that the resonant frequency can be set merely by selecting different capacitances. This is advantageous if the resonant circuits have different resonant frequencies from one another, with the result that the energy transmission between the primary circuit and the secondary circuit is influenced by the resonant circuits with the superimposed resonant frequencies of the resonant circuits or of the resonators.

It may also be advantageous if the winding of the secondary coil and the winding of a coil forming the inductance of the resonant circuit and/or the winding of the primary coil and the winding of a coil forming the inductance of the resonant circuit can be formed as a bifilar winding. If a plurality of resonant circuits is provided, the windings of the coils of the resonant circuits or the windings of some of the coils of the resonant circuit and the primary winding or the secondary winding can be formed as n-filar windings. The provision of n-filar windings simplifies the manufacture of the entire apparatus. In particular, the inductance of the coils formed by the n-filar windings can easily be changed, in particular doubled, by a plurality of coils being interconnected.

In addition, it is advantageous to analyse a signal to be transmitted with the aid of Fourier transformation. A resonant circuit is provided for each of the harmonic oscillations of a signal to be transmitted which has been analysed by Fourier transformation, the resonant frequency of said resonant circuit corresponding to the frequency of the respective harmonic oscillation. As a result, virtually any desired signal forms can be formed from the harmonic oscillations, with the result that, for example, a substantially square-wave signal profile can be produced on the secondary side, for example. Reference is made to the fact that the independent method claim can also be developed with features of individual dependent apparatus claims or corresponding method features.

Further features and advantages of the invention are given in the description below, which, in connection with the attached figures, explains the invention in more detail with reference to exemplary embodiments.

DETAILED DESCRIPTION OF THE INVENTION

Figure 4:
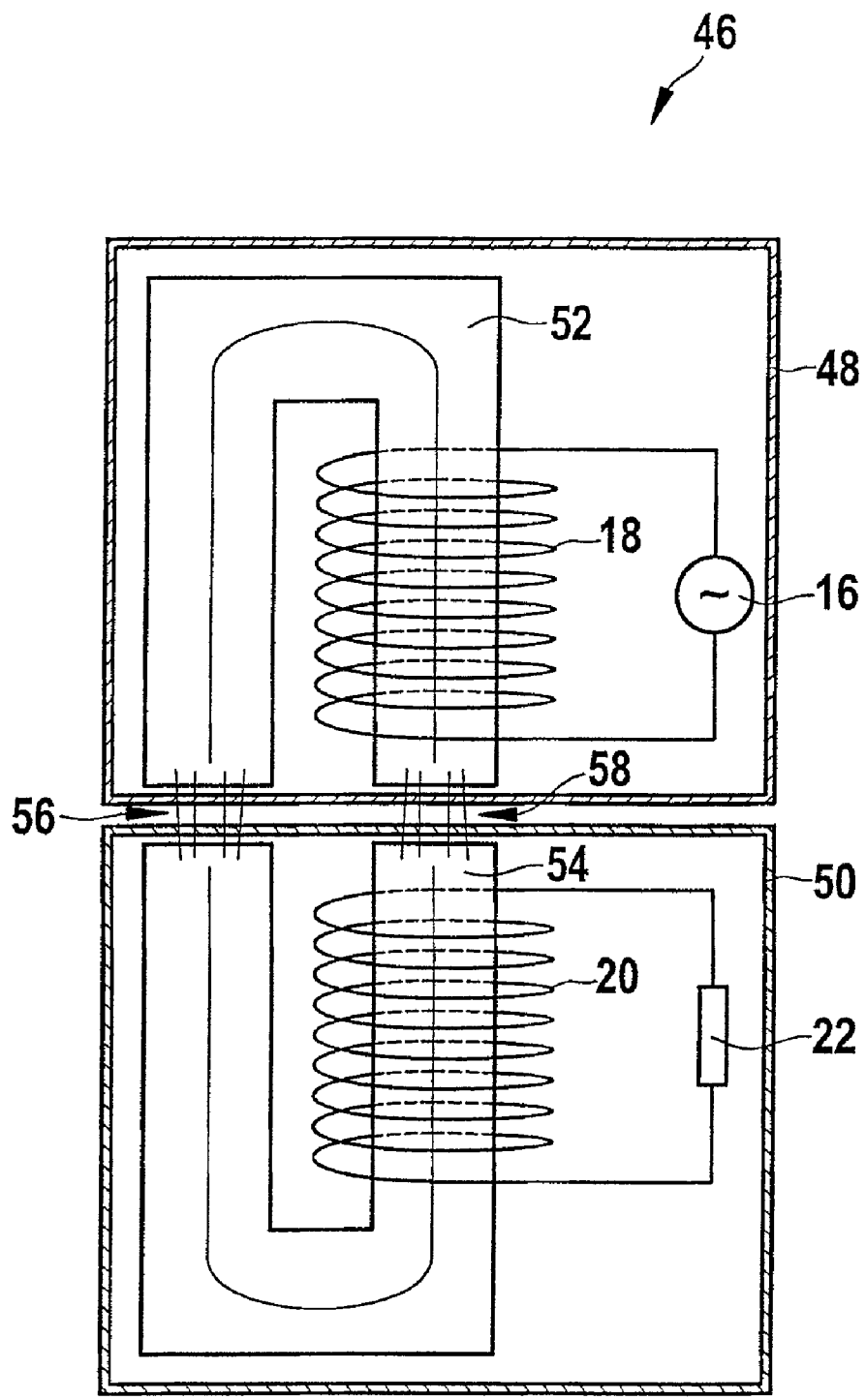
FIG. 4 shows an arrangement for transmitting energy between a source device and target device that each have U-Shaped core segments
Figure 5:
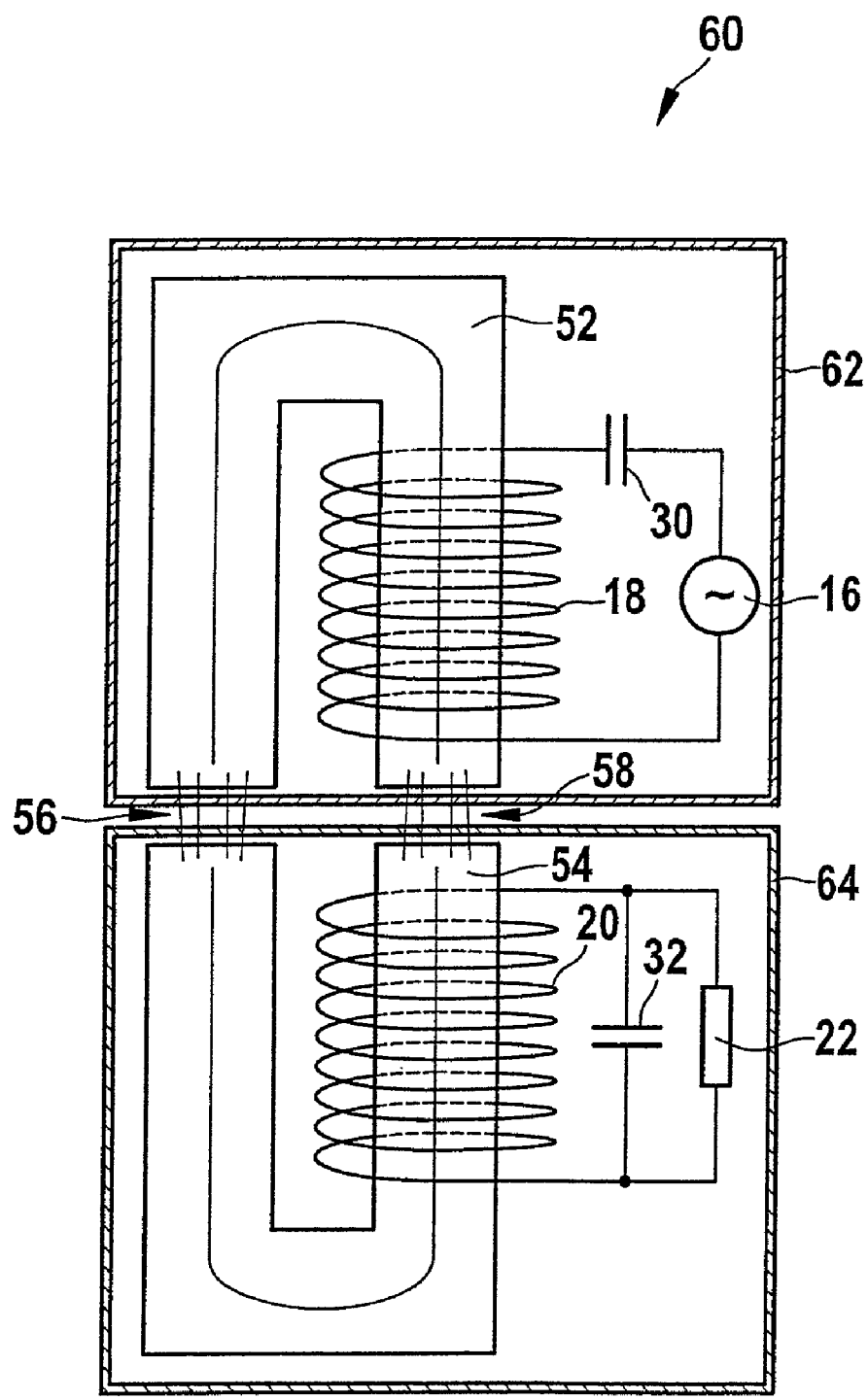
FIG. 5 shows an arrangement for transmitting energy between a source device and target device that each have resonant circuits
Figure 6:
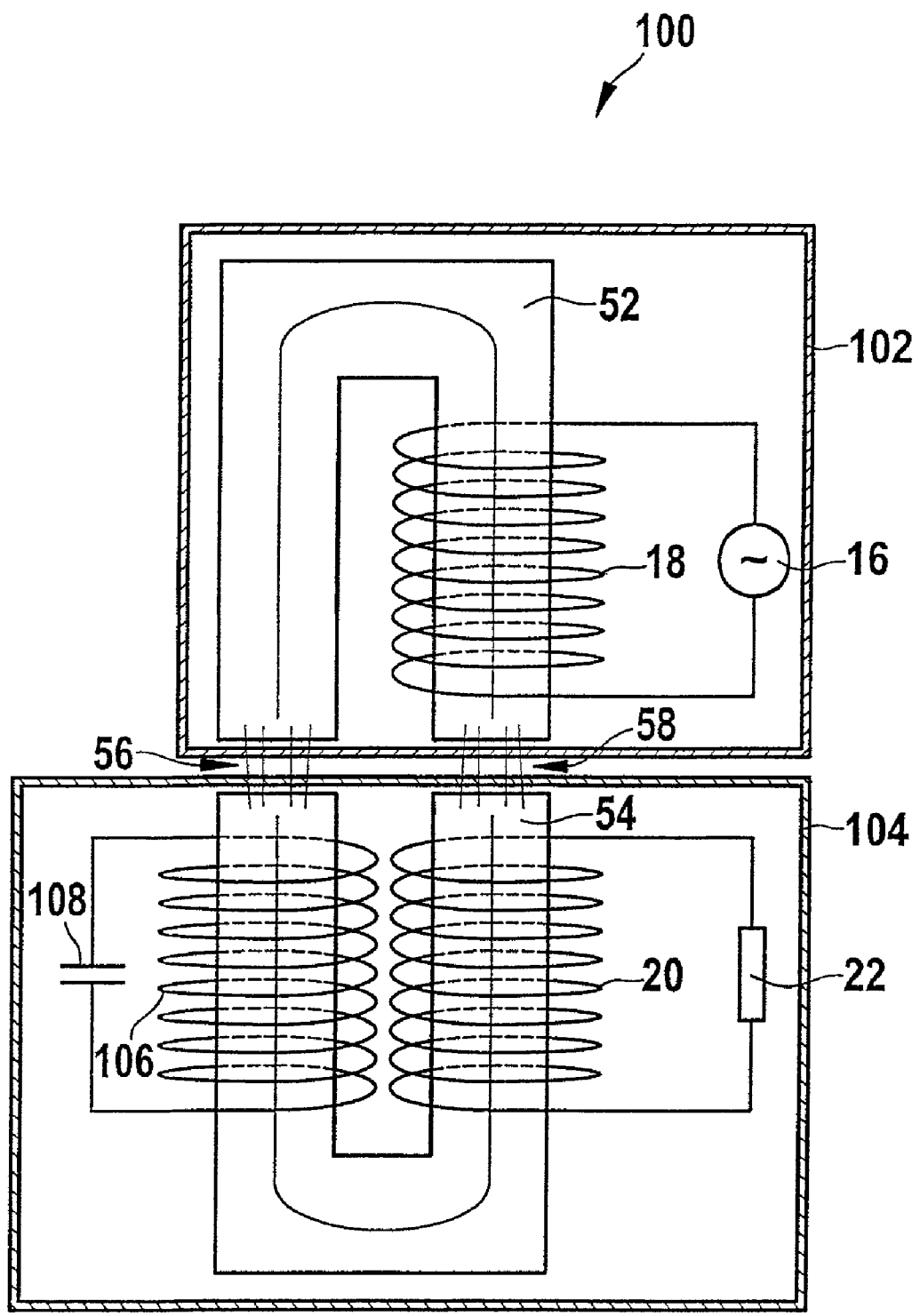
FIG. 6 shows an arrangement for the inductive transmission of energy in accordance with a first embodiment of the invention.

FIG. 6 illustrates an arrangement 100 for wireless energy and/or data transmission between a source device 102 and a target device 104 in accordance with a first embodiment of the invention. The arrangement 100 has a similar design to the known arrangement 46 already described and shown in FIG. 4. Identical elements have the same reference symbols. In addition to the primary-side circuit, which comprises the energy source 16 and the coil 18, the arrangement 100 also has the secondary-side circuit with the secondary coil 20 and with the charging circuit 22 illustrated as a load resistor. The magnet or iron core comprises a first primary-side u-shaped magnet core segment 52, around which the windings of the primary coil 18 are arranged, and a second secondary-side u-shaped magnet core segment 54. The gaps 56, 58 are provided between the magnet core segments 52, 54 in a charging and/or data transmission position of the source device 102 and of the target device 104. In addition, the arrangement 100 has a coil 106, whose windings are arranged around the second magnet core segment 54 and which is electrically connected to a capacitor 108. The coil 106 and the capacitor 108 form a resonant circuit, which has a resonant frequency which is dependent on the inductance of the coil 106 and on the capacitance of the capacitor 108. This resonant circuit is a resonator within the meaning of the invention. In the arrangement 100 shown in FIG. 6, the resonator is therefore arranged on the secondary side, i.e. in the target device 104.

Figure 7:
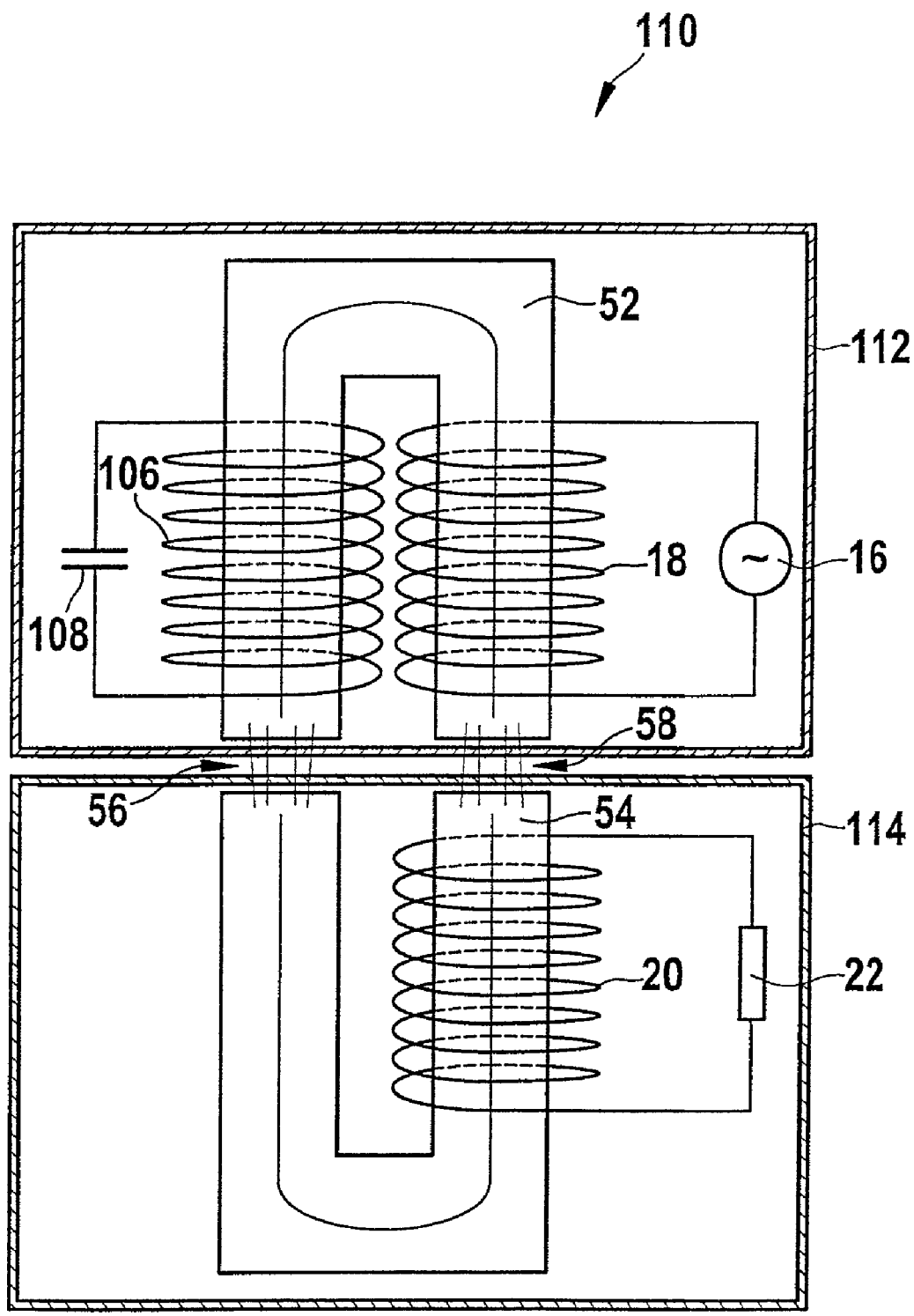
FIG. 7 shows an arrangement for the inductive transmission of energy in accordance with a second embodiment of the invention.

FIG. 7 illustrates an arrangement 110 for wireless energy and/or data transmission between a source device 112 and a target device 114 in accordance with a second embodiment of the invention. The arrangement 110 has a similar design to the arrangement 100 shown in FIG. 6. In contrast to the arrangement 100 shown in FIG. 6, the resonator comprising the coil 106 and the capacitor 108 is arranged physically in the source device 112, with the windings of the coil 106 being arranged around the first magnet core segment 52 of the magnet core.

Figure 8:
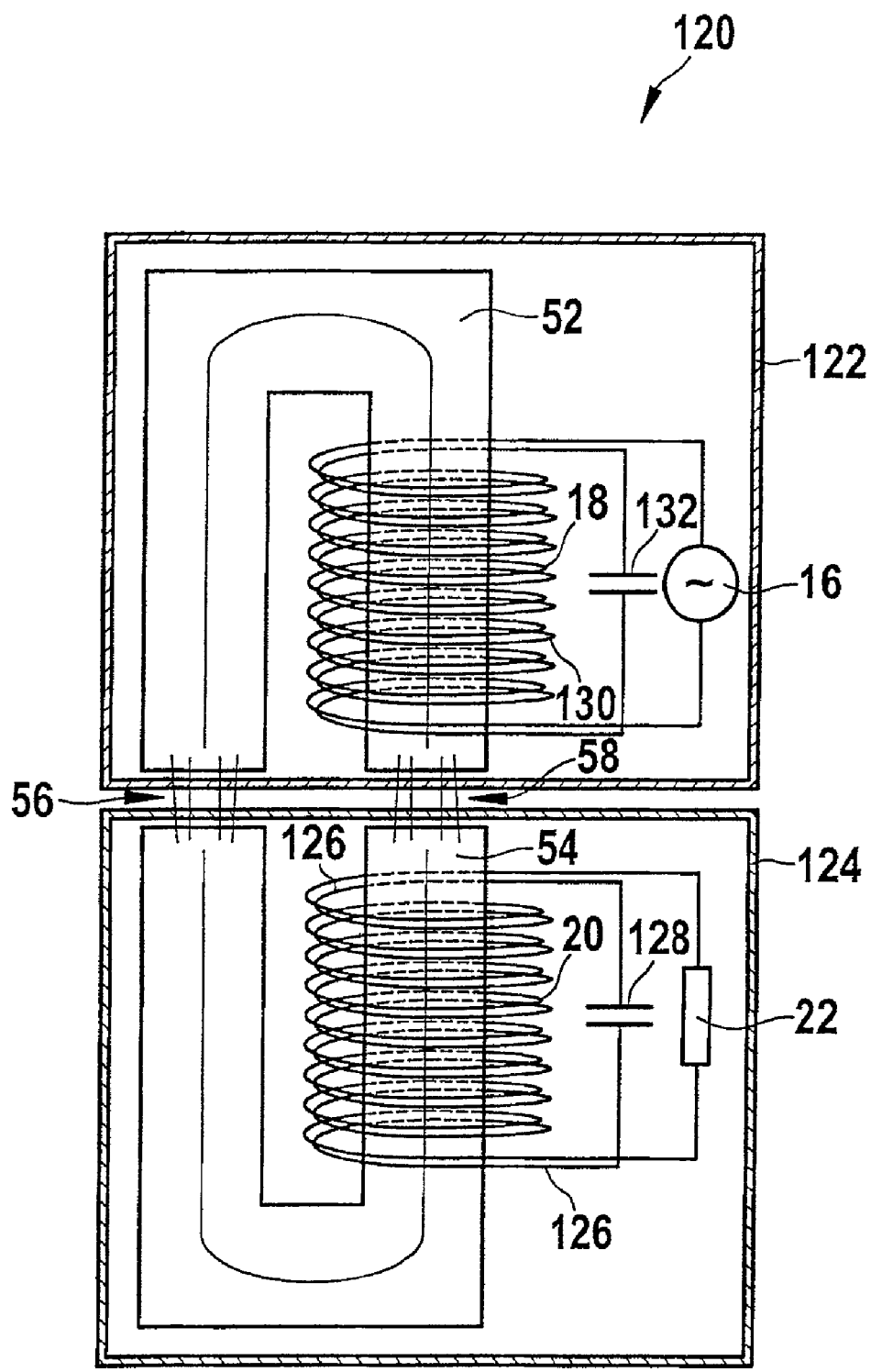
FIG. 8 shows an arrangement for the inductive transmission of energy in accordance with a third embodiment of the invention.

FIG. 8 illustrates an arrangement 120 for wireless energy and/or wire transmission between a source device 122 and a target device 124 in accordance with a third embodiment of the invention, in which both a primary-side resonator and a secondary-side resonator are provided. A coil 126 and a capacitor 128 are electrically connected to one another and form the secondary-side resonator. A coil 130 and a capacitor 132 are electrically connected to one another to form a circuit and form the primary-side resonator. The windings of the coil 130 and of the primary coil 18 on the source-device side are formed as bifilar windings. In the same way, the windings of the coil 126 and of the secondary coil 20 on the target-device side are formed as a bifilar winding.

Figure 9:
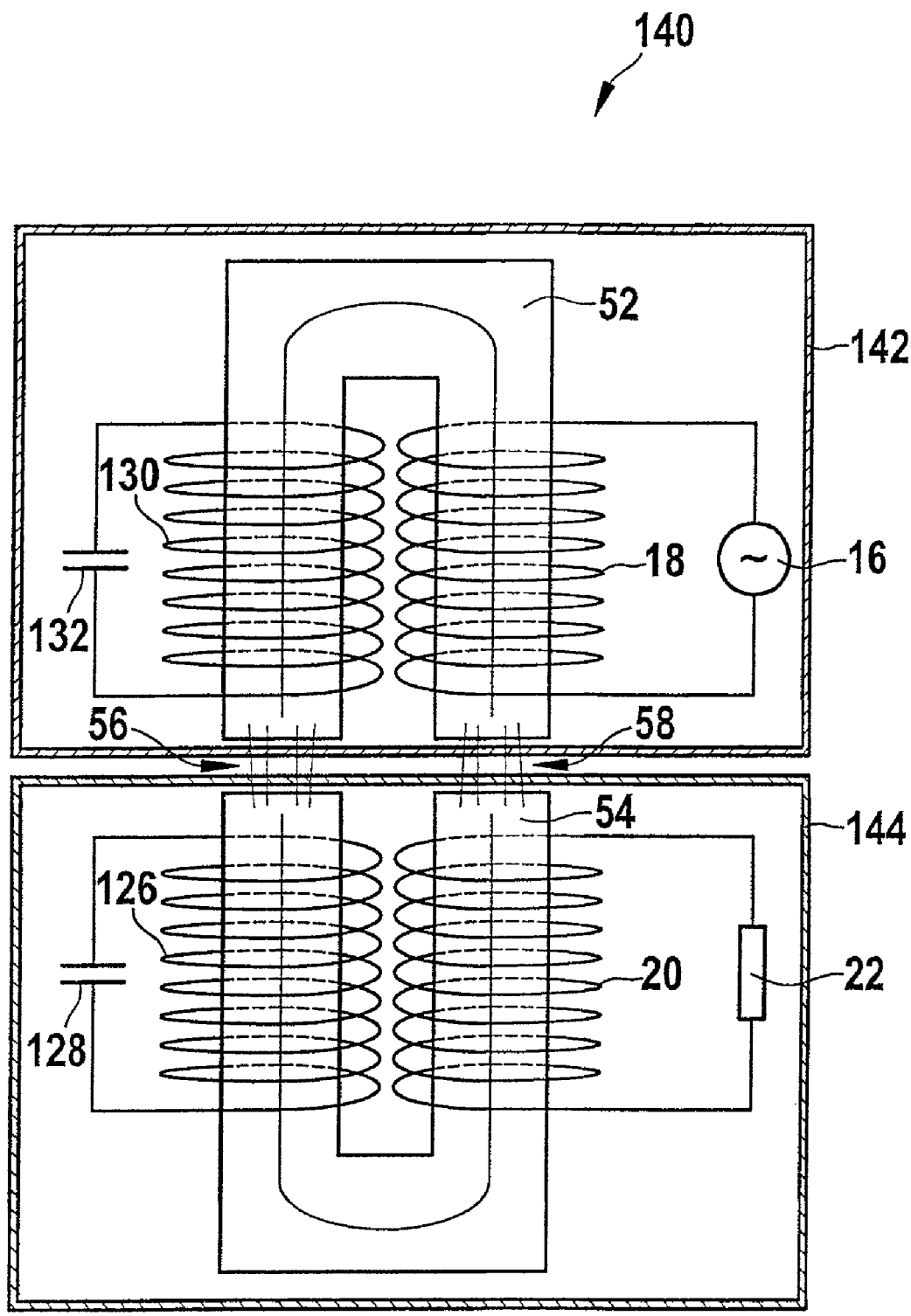
FIG. 9 shows an arrangement for the inductive transmission of energy in accordance with a fourth embodiment of the invention.

FIG. 9 illustrates an arrangement 140 similar to the arrangement 120 shown in FIG. 8 for wireless energy and/or data transmission between a source device 142 and at least one target device 144 in accordance with a fourth embodiment of the invention, in which the windings of the primary coil 18 on the source-device side and of the coil 130 of the primary-side resonator are formed as separate windings. In the same way, the windings of the secondary coil 20 on the target-device side and the coil 126 of the secondary-side resonator are formed as separate windings.

Figure 10:
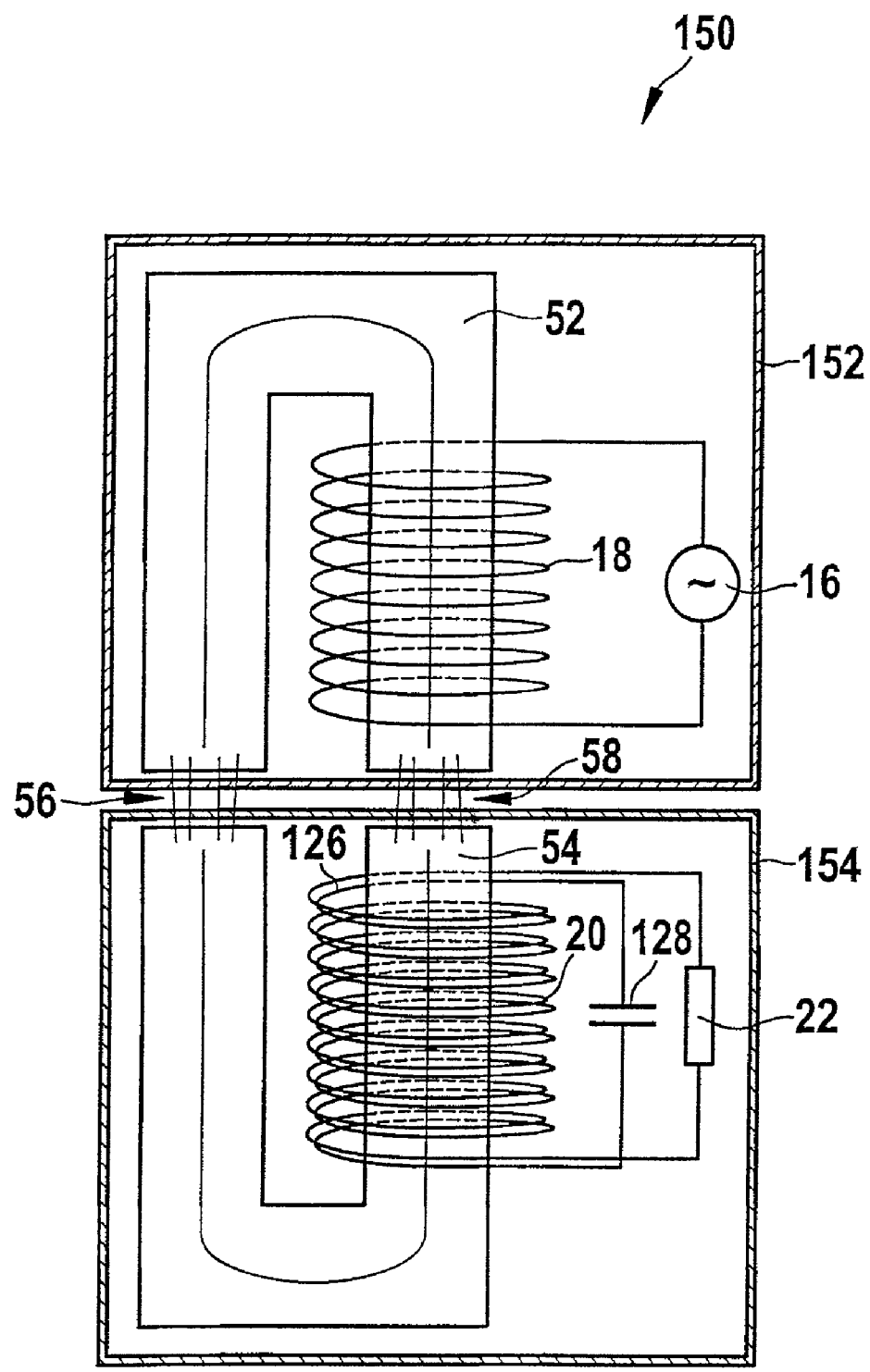
FIG. 10 shows an arrangement for the inductive transmission of energy in accordance with a fifth embodiment of the invention.

FIG. 10 illustrates an arrangement 150 for wireless energy and/or data transmission between a source device 152 and a target device 154 in accordance with a fifth embodiment of the invention which has a resonator on the target-device side. The windings of the coil of the resonator on the target-device side and the secondary coil on the target-device side are formed as bifilar windings in this embodiment. A primary-side resonator is not provided in this embodiment.

Figure 11:
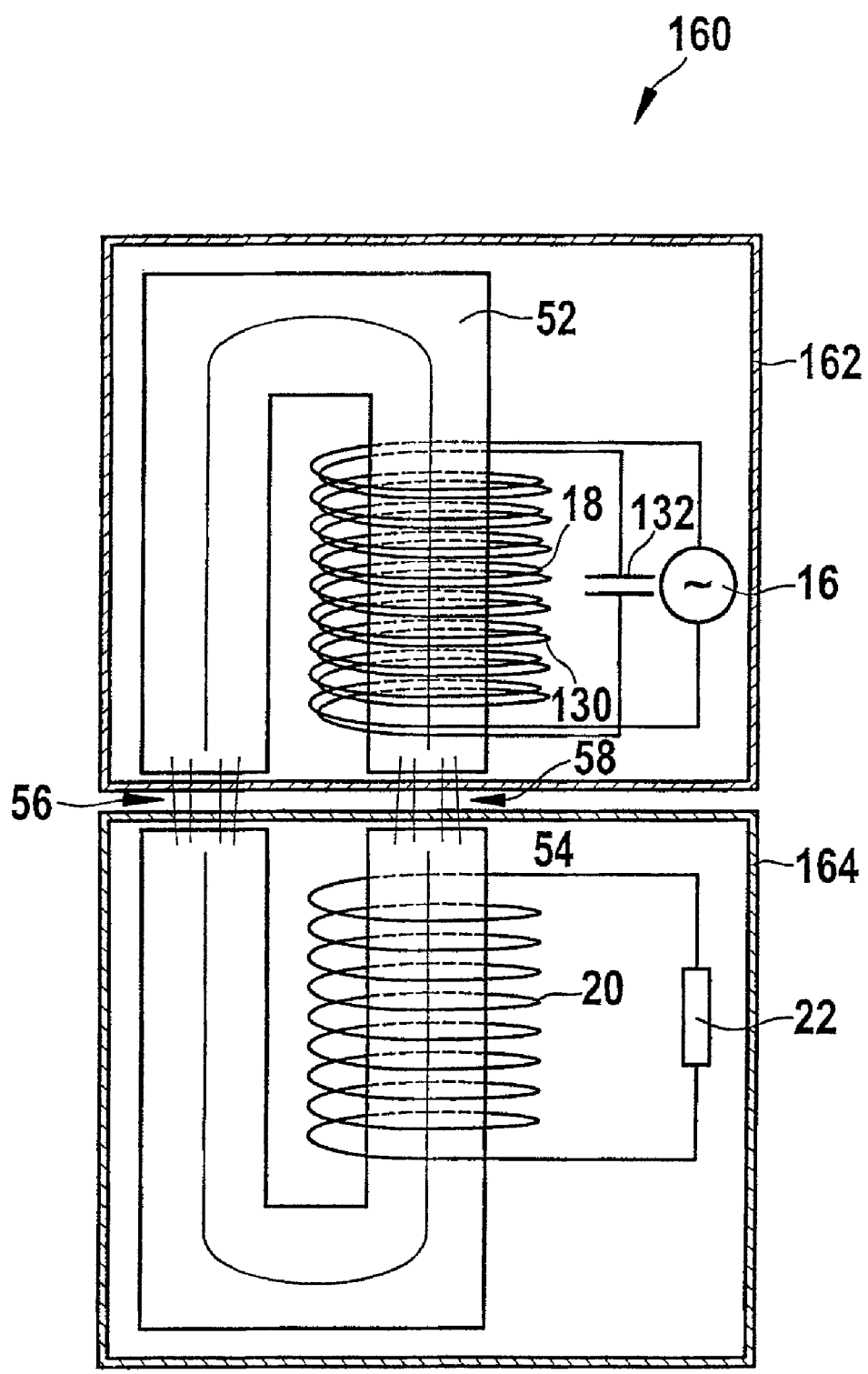
FIG. 11 shows an arrangement for the inductive transmission of energy in accordance with a sixth embodiment of the invention.

FIG. 11 illustrates an arrangement 160 for wireless energy and/or data transmission between a source device 162 and a target device 164 in accordance with a sixth embodiment of the invention. The arrangement has a primary-side resonator. The windings of the coil 130 of the resonator are formed as a bifilar winding with the windings of the primary coil 18 on the source-device side.

The embodiments of the invention described show, in the case of the formations of the winding of the coils of the resonators, either the use of bifilar windings with the primary coil 18 on the source-device side or with the windings of the secondary coil 20 on the target-device side or the formation of separate windings of the primary coil on the source-device side and of the coil of the resonator and a separate arrangement of the secondary coil 20 on the target-device side and of the coil of the resonator or the coils of the resonators. However, in the same way arrangements are possible in which, for example, the windings of a primary-side resonator and the windings of the primary coil 18 on the source-device side are formed as separate windings and the windings of a coil of a secondary-side resonator and windings of the secondary coil 20 on the target-device side are formed as separate windings. In the same way, it is possible to form the windings of the coil of a primary-side resonator and the primary coil 18 on the source-device side as separate windings and to form the windings of the coil of a secondary-side resonator and secondary coil 20 on the target-device side as a bifilar winding. For the purposes of a simplified illustration, in the exemplary embodiments in each case only one resonator is illustrated both on the primary side and on the secondary side. However, it is expedient to provide a plurality of primary-side and/or a plurality of secondary-side resonators in certain embodiments of the invention, with the windings of said resonators preferably being formed as n-filar windings with the primary coil 18 or secondary coil 20 and/or as separate windings from the windings of the primary coil 18 and the secondary coil 20.

If a plurality of resonators are provided, they preferably have different resonant frequencies. In this case it is advantageous to form the coils of all secondary-side resonators and the windings of the coils of all primary-side resonators in each case as n-filar windings, with the result that they in each case have substantially the same inductance. As a result of the n-filar windings, a substantially corresponding inductance of the coils wound in this way can be made possible in a simple manner in the production process. By means of interconnecting a plurality of coils, the inductance can be precisely multiplied. In order to fix the desired resonant frequency, capacitors with a suitable capacitance are then provided, which are each electrically connected to a coil or to a plurality of interconnected coils and therefore form a resonant circuit (resonator). By providing resonators which are not electrically connected to, i.e. electrically isolated from, the primary circuit and the secondary circuit, a high degree of efficiency for the energy and data transmission is achieved. Component tolerances of the components contained in the primary circuit and the secondary circuit and a change in the properties of the load resistor formed by the charging circuit 22 in this case do not result in a change in the properties of the resonator, in particular do not result in a change in the resonant frequency. A complex adjustment or correction of the resonant frequency is therefore not necessary as a result of the invention.

As shown in the exemplary embodiments, it is advantageous to arrange the at least one resonator in the same magnetic circuit as the primary coil and the secondary coil 20. When a plurality of resonators are used, resonant transmission of radiofrequency, non-sinusoidal signals which preferably comprise a plurality of sinusoidal harmonic oscillations can take place. As a result, in particular substantially square-wave signals can be transmitted in a simple manner. The arrangements according to the invention are shown, by way of example, with two u-shaped magnet core segments 52, 54. However, other core shapes of the invention can also be used in the same way. In particular, it is also possible for only one primary-side magnet core to be provided, which magnet core is designed in terms of construction in such a way that it projects mechanically out of the source device. A cutout is then preferably provided in the housing of the target device, into which cutout the projecting magnet core protrudes in a charging position and/or in a data transmission position. The secondary coil 20 is arranged around the cutout, with the result that said secondary coil is arranged around the magnet core if the source device and the target device are located in a data transmission position or energy transmission position. Alternatively or in addition, the target device can have a projecting core region, which protrudes into a cutout of the source device if the source device and the target device are located in a data transmission position or energy transmission position. Then, the primary coil is arranged around the cutout of the source device. Preferably, the housing of the source device or target device is formed around the projecting magnet core and along the cutout, with the result that at least the target device has a circumferentially closed housing.

Figure 1:
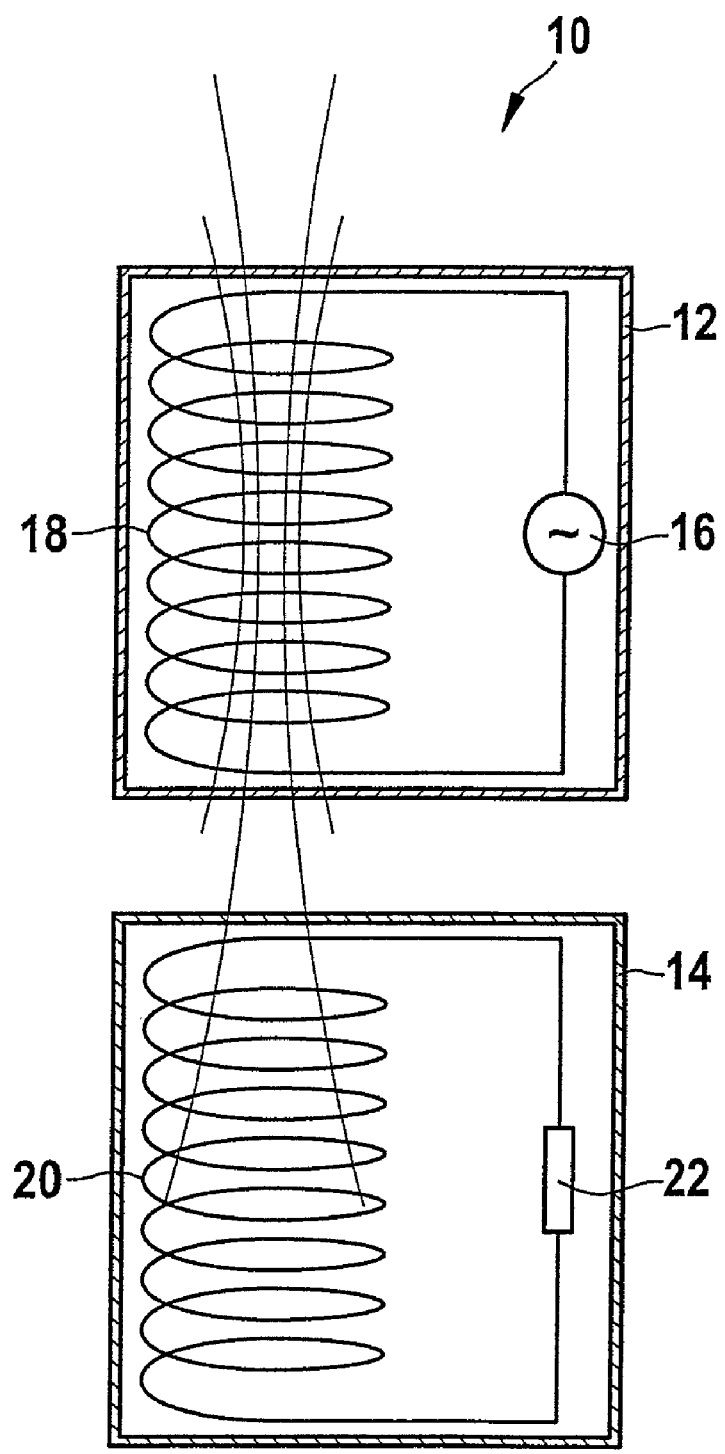
FIG. 1 shows an arrangement for the inductive transmission of energy
Figure 2:
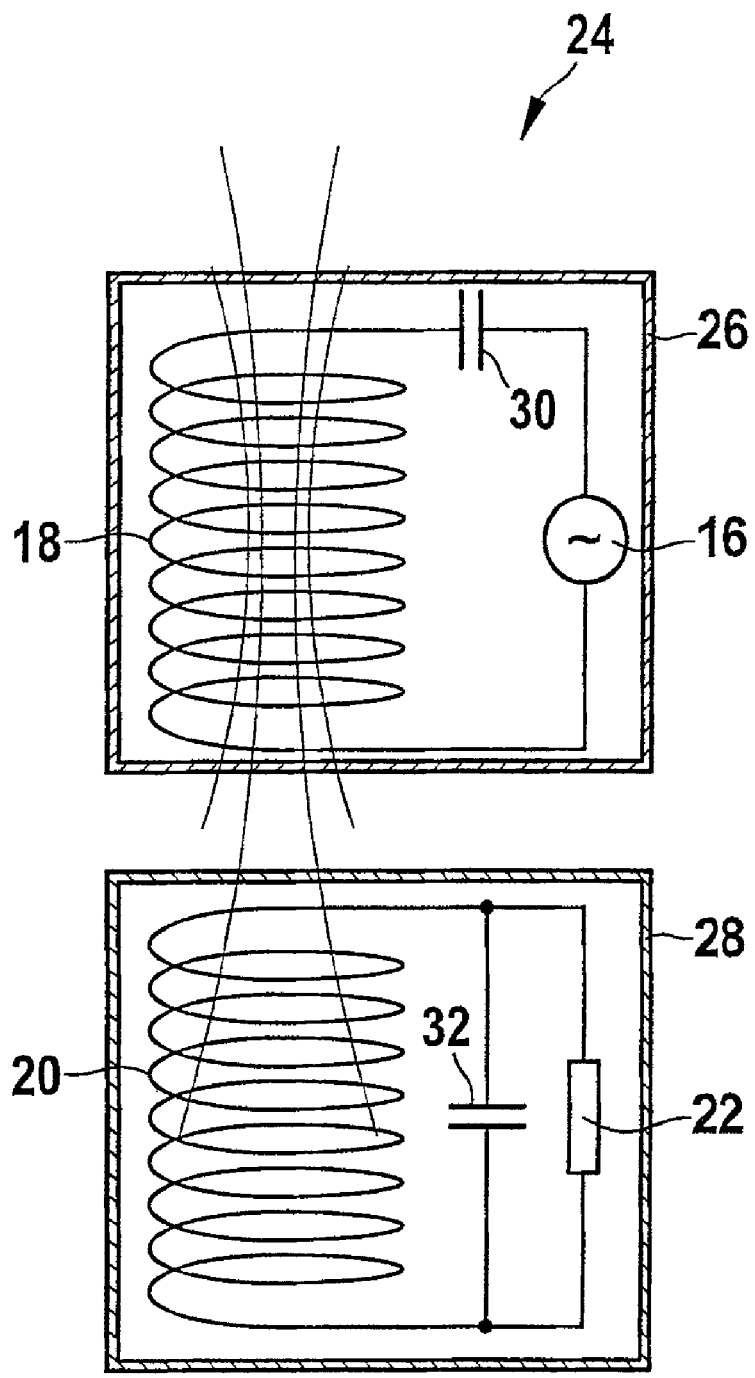
FIG. 2 shows an arrangement for transmitting energy between a source device and a target device that each have a capacitor
Figure 3:
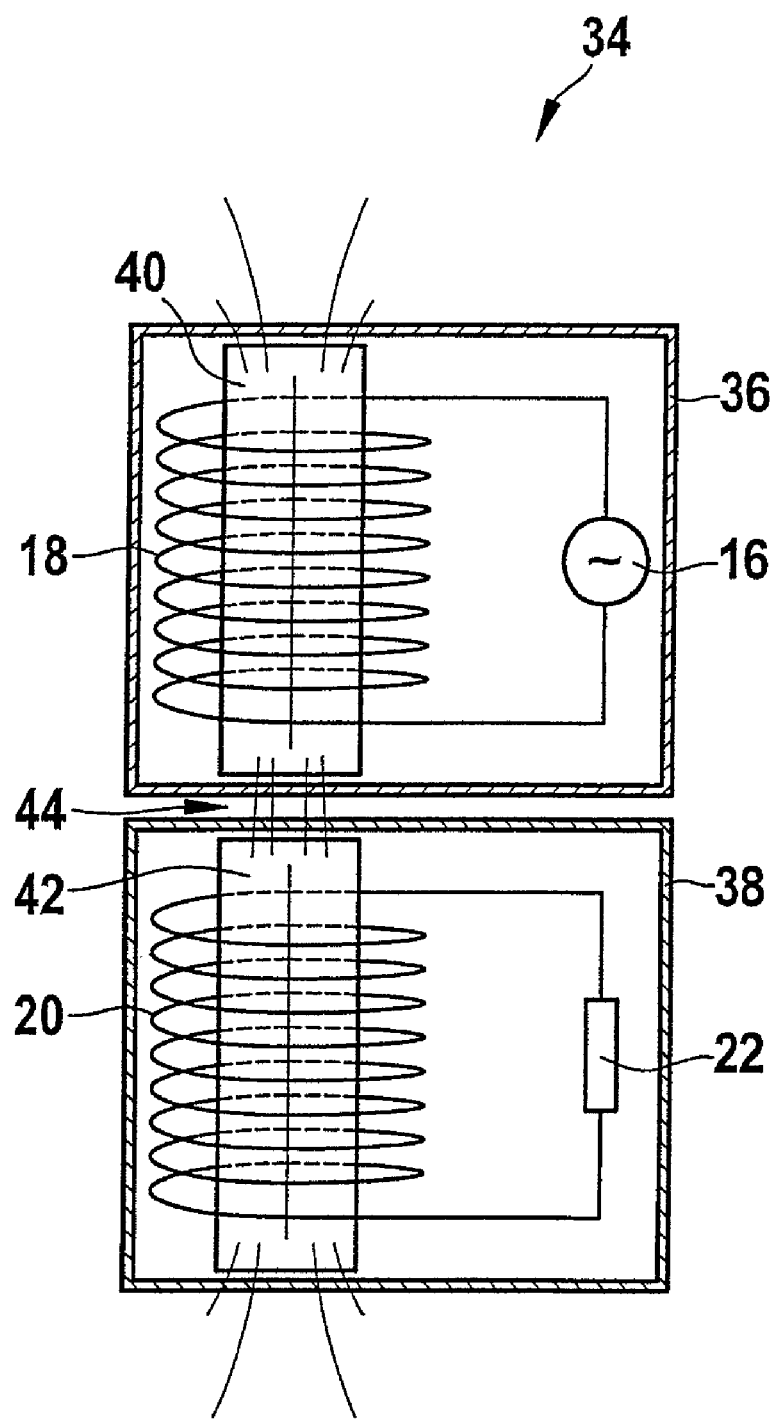
FIG. 3 shows an arrangement for transmitting energy between a source device and target device that each have a coil arranged around an iron core segment

The energy transmission between the primary side on the source-device side and the secondary side on the target-device side is substantially dependent on the intensity of the magnetic field induced by the primary coil or the magnetic flux in the magnetic circuit and the frequency of the AC voltage generated by the energy source 16. Owing to the resonant circuits, in particular magnification of the current and/or voltage due to resonance may take place. A bar-shaped formation of the magnet core, as is shown in connection with FIG. 2, can lead to problems with EMC owing to the relatively free propagation possibilities of the lines of force of the magnetic field in the outer region. In addition, the field strength or the magnetic flux can only be increased with a relatively large degree of complexity. The quantity of energy transmitted to the secondary side depends on the magnetic field strength and the frequency at which the magnetic field strength changes. A voltage is induced in the secondary coil 20 as a result of the change in the field strength of the magnetic field induced by the primary coil.

According to the invention, a primary-side circuit with a primary-side coil, a secondary-side circuit with a secondary-side coil and a resonator, which is additionally arranged in the magnetic circuit or in the region of the magnetic field induced by the primary coil, are used in order to make wireless energy transmission or data transmission between the primary side and the secondary side possible.

Owing to the invention, measures do not need to be taken either on the primary side or on the secondary side in order to meet resonance conditions. Instead, compensation of the wattless power can take place on the primary side or secondary side, in particular independently of the resonance condition.

The arrangement of the resonators on the primary side and/or on the secondary side is of secondary importance for the system to function. Instead, design-related requirements, in particular physical sizes of the target device and/or source device, can be taken into consideration. It is advantageous if the energy source 16 has an AC voltage with a frequency in the region of from 20 kHz to 5 MHz, preferably in the region of from 60 kHz to 500 kHz.

While the present invention has been illustrated and described with respect to a particular embodiment thereof, it should be appreciated by those of ordinary skill in the art that various modifications to this invention may be made without departing from the spirit and scope of the present invention.

What is claimed is:

1. An apparatus for wireless energy and/or data transmission between a source device and at least one target device, the apparatus comprising:
   at least one primary coil, on the source-device side, of at least one primary circuit;
   at least one secondary coil, on the target-device side, of at least one secondary circuit;
   a first resonator having a first resonant circuit with a first resonant circuit coil and a first capacitor, the first resonant circuit being electrically isolated from the primary circuit and from the secondary circuit; and
   at least a second resonator having a second resonant circuit with a second resonant circuit coil and a second capacitor, the second resonant circuit being electrically isolated from the primary circuit and from the secondary circuit and from the first resonant circuit, at least one of the first and second resonators has a resonant frequency which is different from the frequency of an energy source arranged in the primary circuit, the resonant frequency being twice or 0.5 times the frequency of the energy source;
   wherein the primary coil, the secondary coil, the first resonant circuit coil, and the second resonant circuit coil are arranged in the same magnetic circuit.

2. A method for wireless energy and data transmission between a source device and at least one target device,
   in which a voltage is induced and a first resonator and at least a second resonator are excited by at least one primary coil, on the source-device side, of at least one primary circuit and at least one secondary coil, on the target-device side, of at least one secondary circuit;
   the first resonator being formed by a first resonant circuit with at least one first resonant circuit coil and with at least a first capacitor, the first resonant circuit being electrically isolated from the primary circuit and from the secondary circuit;
   the second resonator being formed by a second resonant circuit with at least a second resonant circuit coil and with at least a second capacitor, the second resonant circuit being electrically isolated from the primary circuit and from the secondary circuit, at least one of the first and second resonators has a resonant frequency which is different from the frequency of an energy source arranged in the primary circuit, the resonant frequency being twice or 0.5 times the frequency of the energy source; and
   wherein the primary coil, the secondary coil, the first resonant circuit coil, and the second resonant circuit coil are arranged in the same magnetic circuit.

3. The method according to claim 2, wherein energy is supplied to the resonant circuits by the induced voltage, and the energy excites the respective resonant circuits, and
   in that the excited resonant circuits generate a magnetic field which alternates with the resonant frequency of the respective resonant circuit and by means of which a voltage is induced in the secondary coil.

4. The apparatus according to claim 1, wherein the primary coil, the secondary coil, the first resonant circuit coil, and the second resonant circuit coil forming the inductance of the resonant circuit being arranged around a magnet core forming the magnetic circuit.

5. The apparatus according to claim 1, wherein at least one of the first and second resonant circuit coils include windings that are formed as a bifilar winding.

6. The apparatus according to claim 1, wherein the first and second resonators have different resonant frequencies from one another.

7. The apparatus according to claim 1, wherein the winding of the secondary coil and at least one of the first and second resonant circuit coils include windings being formed as a bifilar winding.

* * * * *